Feb. 15, 1955     S. W. LEMING     2,701,897
WINDSHIELD CLEANING SYSTEM
Filed Nov. 15, 1950
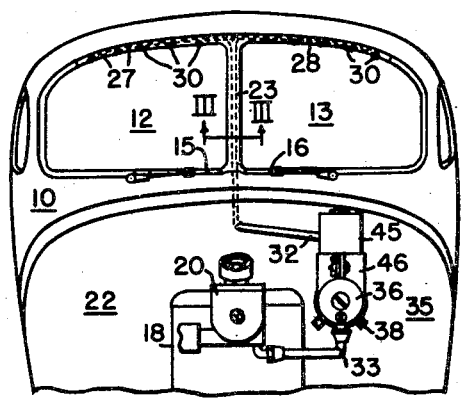
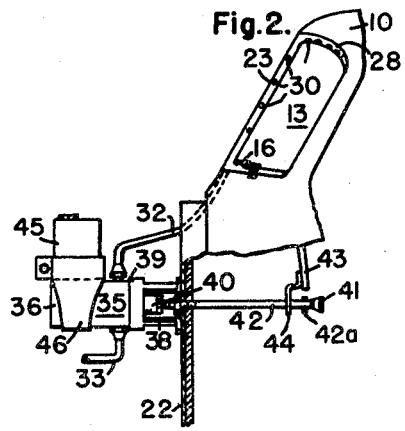
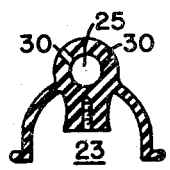
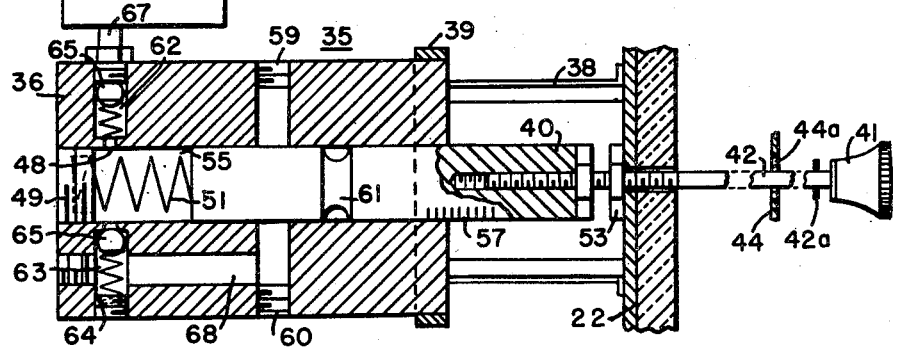
INVENTOR.
Samuel W. Leming.
BY
*F. V. Giolma*
ATTORNEY

United States Patent Office 2,701,897
Patented Feb. 15, 1955

2,701,897

WINDSHIELD CLEANING SYSTEM

Samuel W. Leming, East Aurora, N. Y.

Application November 15, 1950, Serial No. 195,811

6 Claims. (Cl. 20—40.5)

My invention relates generally to window cleaning apparatus, and it has reference in particular to a system for cleaning the windshield of an automobile or the like.

Generally stated, it is an object of my invention to provide a windshield cleaning system that is simple and inexpensive to manufacture, and is reliable and effective in operation.

More specifically, it is an object of my invention to provide a windshield cleaning system which utilizes the water from the cooling system of the vehicle.

Another object of my invention is to provide in a windshield cleaning system for utilizing pressure from the water pump of a vehicle for supplying water to the cleaning system.

Yet another object of my invention is to provide a windshield cleaning system having a duct located above the lower edge of the windshield for spraying water on the windshield from above.

It is also an object of my invention to provide in a windshield cleaning system for utilizing water or other cleaning fluid from one source, and supplying a metered amount of detergent with the cleaning fluid when it is initially applied.

It is also an object of my invention to provide in a windshield cleaning system for utilizing a valve for permitting water to be used from the cooling system of the vehicle for spraying on the windshield, and also using the valve to inject a metered amount of detergent into the stream of water, only at the instant the valve is operated.

Other objects will, in part, be obvious, and will, in part, be explained hereinafter.

In practising my invention according to one of its embodiments, a duct is provided along the upper edge of the windshield of an automobile, and is connected to the outlet or pressure side of the water pump of the vehicle for supplying water to spray out of spaced openings in the duct, whence it may run down the windshield and assist the windshield wipers in cleaning, mud, dust, etc. from the windshield. A valve is utilized to normally block the flow of water to the duct, and it is provided with a connection to a container holding a suitable detergent, for injecting a metered amount of the detergent into the stream of water just at the instant the water is turned on. Thereafter water alone is supplied for flushing the windshield.

For a more complete understanding of the nature and scope of my invention, reference may be made to the following detailed description, which may be read in connection with the accompanying drawing in which:

Fig. 1 is a front elevational view in part, of an automobile, illustrating one embodiment of the invention;

Fig. 2 is a side elevational view, in part, of the automobile shown in Fig. 1;

Fig. 3 is a sectional view taken along the line III—III of Fig. 1, shown enlarged;

Fig. 4 is an enlarged vertical section of a valve such as shown in Figs. 1 and 2;

Fig. 5 is an enlarged sectional view of an alternate form of valve which may be used in place of the valve shown in Figs. 1, 2 and 4;

Fig. 6 is a cross-sectional view of the valve shown in Fig. 5.

Referring particularly to Figs. 1 and 2, the reference numeral 10 may refer generally to the body of an automobile or the like having a windshield of the divided type comprising windshield sections 12 and 13 provided in the usual manner with windshield wipers 15 and 16, which for the purposes of this invention may be of any suitable type, either electrically or vacuum operated, as may be desired. The motor or engine block of the vehicle may be designated by the numeral 18, being for example, of the well-known water-cooled type, having a water pump 20 which may be mounted on the engine block and driven from the engine by means of a belt or the like (not shown). A fire wall of the usual type, designated by the numeral 22, separates the engine compartment from the interior of the body.

In order to assist the wipers 15 and 16 in cleaning mud, dust and the like from the windshield, the molding 23 which separates the sections 12 and 13 of the windshield, may be provided with an interior duct 25 for cleaning fluid, as shown in Fig. 3, and it may be connected with oppositely extending sections of ducts 27 and 28 disposed along the upper edges of the windshield sections. The ducts 27 and 28 may be provided with a plurality of spaced openings 30 for spraying water downwardly over the windshield sections. The molding 23 may also be provided with similar spaced openings 30 for spraying water over the windshield sections, if desired.

Means such as the conduits 32 and 33 may be provided for connecting the duct 25 to a source of cleaning fluid. Inasmuch as not more than about one half pint of water has been found sufficient for a cleaning operation, the conduit 33 may be connected to the cooling system of the vehicle so as to use a portion of the water therefrom for cleaning purposes. The conduit 33 may, for example, be connected to the outlet or pressure side of the water pump 20 for supplying water to the duct 25 under sufficient pressure.

For the purpose of controlling the supply of water to the duct 25, valve means designated generally by the numeral 35, may be provided. The valve means 35 may comprise a valve body 36 to which the conduits 32 and 33 may be connected. The body 36 may be mounted in any suitable manner, being, for example, secured to the fire wall 22 by means of circumferentially spaced feet 38 connected to the body by a clamp 39. The valve may be provided with a movable valve member 40 having an operating handle 41 on a shaft 42 which extends through the fire wall, and is conveniently located beneath the dashboard 43 by means such as a bracket 44 having a slotted opening 44a to receive the shaft. The shaft 42 may be provided with a transverse pin 42a disposed to pass through the opening 44a when aligned therewith, and disposed to lock the handle in the operating position when rotated out of alignment with the opening. The valve member 40 normally blocks connections between the conduits 32 and 33, and provides a passage therebetween when operated to the operating position.

A container 45 for a suitable detergent, preferably liquid, may be disposed adjacent the valve means, being, for example, mounted on the body member 36 by means of a clamp support 46 which may be of the wrap-around type. By referring particularly to Fig. 4, it will be seen that the valve body 36 may be provided with a central bore 48 in which the valve member 40 is disposed to slide with a relatively snug fit. A plug 49 closes one end of the bore. Means such as a spring 51 may be provided, if desired, to bias the valve member away from the plug 49, so as to slowly return it to the off position, and normally provide a chamber of predetermined content at the plug end of the bore. The spring 51 and the pin 42a may be omitted, if desired, in which case the valve member 40 will remain in either the on or off position until manually operated to the other. A nut 53 may be threaded onto the shaft 42 to determine the normal or off position of the valve member 40, and hence the size of the chamber 55, which determines, as will be explained hereinafter, the amount of detergent which is injected into the stream of water for cleaning. A calibrating scale 57 on the valve member indicates the valve setting and aids in selecting the amount of detergent which will be used.

The body 36 of the valve may be provided with oppositely disposed passages 59 and 60 to which the conduits 32 and 33 may be connected. The valve member 40 normally blocks any connection between these passages, but is provided with a passage such as the annular groove 61 for affording a connection therebetween, when the valve member is actuated to the left to align the groove with the passages 59 and 60.

The body 36 may be further provided with oppositely disposed passages 62 and 63 connecting with the bore 48 at the plug end thereof. A plug 64 closes the outer end of passage 63. Both of these passages are provided with one-way check valves 65 which permit the flow of fluid in the downward direction only, as shown in Fig. 4. A conduit 67 connects the detergent container 45 to the upper end of passage 62, while a passage 68 connects the passage 63 with the passage 60. In operation, the chamber 55 will normally be filled with detergent which will have been drawn from the container by the pump action of the valve member 40 being returned to the position shown, by the spring 51, since the check valve 65 in the passage 63 effectively blocks any flow to the chamber therefrom, hence the chamber will be filled by detergent sucked in through the check valve 65 in the passage 62. The valve member 40 as shown effectively blocks the flow of fluid from the passage 60 to the passage 59.

To clean the windshield, the handle 41 is pushed to the left, the pin 42a passing through the slotted opening 44a, until the groove 61 aligns with the passages 59 and 60. The shaft 42 may now be rotated slightly to lock the pin 42a against returning through the opening 44a. The pump 20 is now effective to force water from the cooling system through the conduits 33 and 32, up into ducts 25, 27 and 28, whence it emerges in sprays from the openings 30 and flows downwardly over the windshield. The detergent from the chamber 55 will be forced into the stream of water as the valve member 40 moves to the left. It is forced out through the check valve 65 in the passage 63, and flows through the passage 68 into the passage 60, where it mixes with the initial flow of water to assist the wipers in cleaning the windshield sections. Since only the amount of detergent contained in the chamber 55 is pumped into the stream of water, the windshield is first flushed with a mixture of detergent and water, and is then rinsed with a continuing stream of water until the valve member 40 is returned to the off position. When this is done, a fresh amount of detergent is drawn from the container 45 into the chamber 55, ready for the next washing operation.

Referring to Figs. 5 and 6, it will be seen that instead of the valve disclosed in Figs. 1, 2 and 4, a rotary valve 69 may be used. The valve 69 may comprise a body member 70 having a tapered plug valve member 72 rotatably mounted therein, in a tapered bore 73 in any manner well-known in the art. The body 70 may be provided with oppositely disposed passages 75 and 76 for receiving the conduits 32 and 33 of the cleaning system, and the valve member 72 may be provided with a connecting valve passage 78 which is normally disposed transversely of the passages 75 and 76, and in connection with a passage 79, which connects to the detergent container 54 through a conduit 80.

The valve 69 operates in a manner similar to that of the valve 36 to supply a measured amount of detergent normally in the valve passage 78, in the initial stream of water, when the valve member is rotated to place the passage 78 in line with the passages 75 and 76. This mixture of detergent and water will be followed by a flow of water so long as the valve is open, and it may be turned off after sufficient flow to clean the windshield.

From the above description and the accompanying drawing it will be apparent that I have provided a simple and effective cleaning system which does not require a special supply of cleaning fluid which may be readily depleted. Warm water from the cooling system is particularly advantageous under icing conditions. By using the water pump to supply water to the ducts, the system is greatly simplified. By having the ducts above the windshield the natural downward flow of the water is used to clean the windshield.

Since different embodiments of the invention may be made without departing from the scope and spirit thereof, it is intended that all the matter contained herein and shown in the accompanying drawing, shall be considered as illustrative and not in a limiting sense.

I claim as my invention:

1. In combination, a duct having openings disposed along an edge of a windshield, conduit means connecting the duct to a supply of cleaning fluid, a container for a detergent, valve means normally blocking said conduit means operable to provide a passage from the supply to said duct, said valve means being operable to connect the detergent container to the conduit means to supply a limited amount of detergent to the conduit means when operated.

2. In a windshield cleaning system for a vehicle having a liquid cooling system, a duct disposed along an upper edge of the windshield and having a plurality of openings directed toward the windshield, conduit means disposed to connect the duct to the cooling system, a container for a detergent, and valve means connected to the container and conduit means having a valve member normally blocking said conduit means operable to provide a connection between the cooling system and the duct, said valve member having a passage disposed to provide said connection, and said passage being normally connected to said detergent supply means.

3. In a cleaning system, a duct having openings to spray a cleaning fluid, conduit means disposed to connect the duct to a supply of cleaning fluid, a detergent container, valve means normally blocking said conduit means operable to provide a connection between the duct and said supply, and conduit means connecting the detergent container to the valve means to supply a predetermined amount of the detergent to said conduit means when the valve means is operated.

4. In a cleaning system for a windshield, a duct having an opening adjacent one edge of the windshield, conduit means connecting the duct to a source of cleaning fluid, a detergent container, valve means including a body member having connections for said conduit means and a movable valve member normally blocking said connections, said valve member having a channel disposed to connect said connections and being operable to admit detergent from the container into said connections.

5. In a cleaning system for a windshield of a vehicle having a fluid cooling system, a duct having a plurality of spaced openings along an upper edge of the windshield, conduit means connecting said duct to the cooling system, a detergent container, and rotary valve means connected in the conduit means, said valve means having a valve member with a passage connected to the detergent container and operable to dispose said passage in connecting relation between adjoining sections of the conduit means.

6. The combination in a vehicle having a windshield and a fluid cooling system including a circulating pump having suction inlet and pressure outlet sides, of a duct having an opening adjacent an edge of the windshield for directing a fluid on the windshield, conduit means connecting the duct to the pump on the pressure side for supplying fluid to the duct solely in response to pressure from the pump, and a valve having a movable valve member normally biased to block said conduit means, and having a passage therein providing a direct connection between the pump and the duct for continuously supplying fluid to the duct upon movement of the valve member against said bias.

References Cited in the file of this patent

UNITED STATES PATENTS

| 932,386 | Gross | Aug. 24, 1909 |
| 1,479,103 | Lyons | Jan. 1, 1924 |
| 1,502,821 | Harrington | July 29, 1924 |
| 1,811,724 | Manley | June 23, 1931 |
| 1,998,387 | Rogers | Apr. 16, 1935 |
| 2,012,218 | Burress | Aug. 20, 1935 |
| 2,176,143 | Miller | Oct. 17, 1939 |
| 2,216,890 | Phillips | Oct. 8, 1940 |
| 2,258,922 | Albee | Oct. 14, 1941 |
| 2,304,691 | Hund | Dec. 8, 1942 |

FOREIGN PATENTS

| 566,690 | Great Britain | Jan. 9, 1945 |